UNITED STATES PATENT OFFICE.

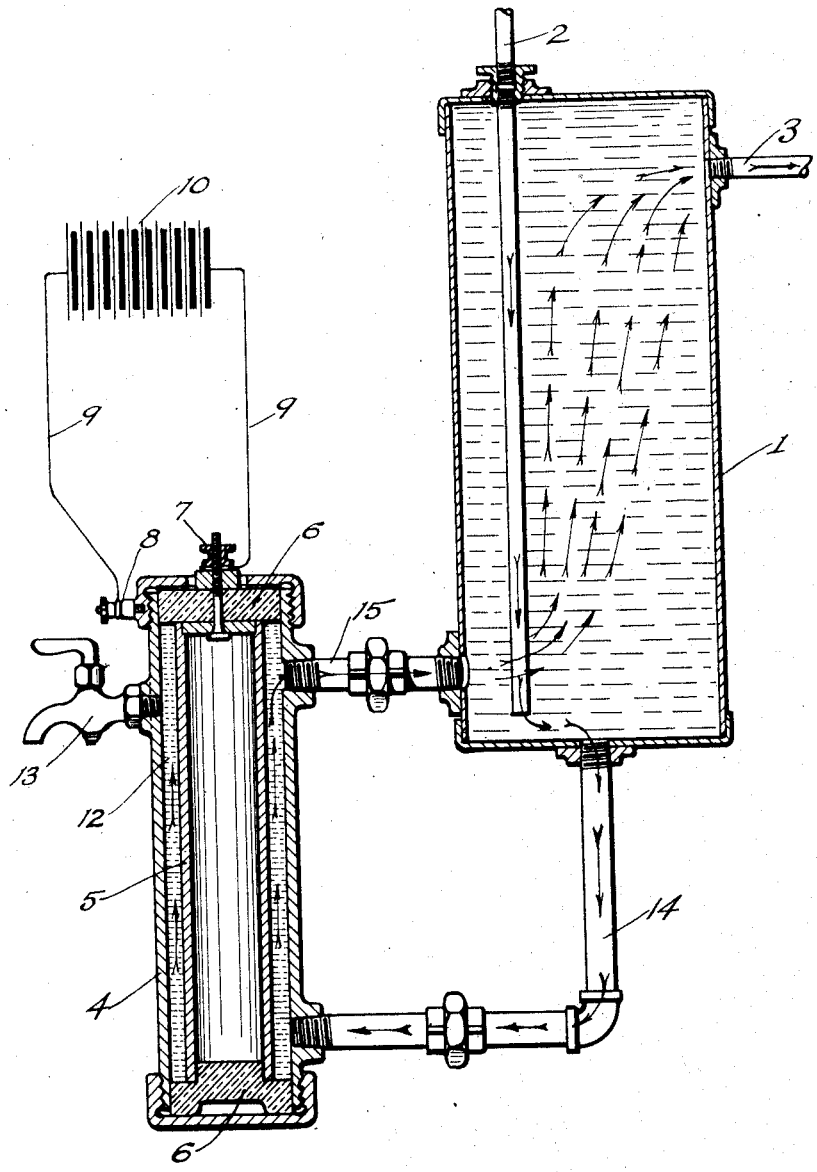

ARTHUR MAX WERNER, OF SAN JACINTO, CALIFORNIA.

ELECTRIC WATER-HEATER.

1,387,819.  Specification of Letters Patent.  Patented Aug. 16, 1921.

Application filed September 23, 1920. Serial No. 412,126.

*To all whom it may concern:*

Be it known that I, ARTHUR MAX WERNER, a citizen of the United States, residing at San Jacinto, in the county of Riverside and State of California, have invented new and useful Improvements in Electric Water-Heaters, of which the following is a specification.

It is the object of this invention to provide a water heater which will be efficient in its action and which provides for the withdrawal of the water as soon as it is heated in order to provide an instantaneous heater.

The invention will be readily understood from the following description of the accompanying drawing showing a longitudinal section through a heater constructed in accordance with the invention.

The heater consists essentially of a tank and a casing having an electrode mounted in the same, suitable connections being provided between the tank and casing to form circulating means for the water. The tank is shown at 1 having a water supply pipe 2 extending within the same to a point adjacent the bottom of the tank. The tank is also provided with a discharge pipe 3 for the heated water adjacent the top of the tank.

The casing containing the electrode is shown at 4. The electrode mounted in the casing is shown as a copper tube 5 supported within the casing in spaced relation from the walls of the same by means of insulator blocks 6. One terminal 7 for an electrical circuit is connected to the tube 5 through one of the insulator blocks 6, and the other terminal 8 for the electrical circuit is connected to the casing 4. These terminals are connected by wiring to a source of electrical energy shown as a storage battery 10 and the circuit as thus arranged is completed from the electrode 5 to the casing 4 through the fluid to be heated and which is contained in the space 12 between the electrode and the casing.

A discharge faucet 13 is provided in casing 4 adjacent the top of the same. This faucet is employed for withdrawing hot water from the apparatus as instantaneous hot water is required at the device.

Connections are provided between tank 1 and the casing 4 for causing water circulation through the casing, said connections being shown as a pipe 14 extending from the bottom of tank 1 to the bottom of casing 4, and a pipe 15 extending from the top of casing 4 to a point in casing 1 which may also be adjacent the bottom of the same.

In operation the cold water supplied to tank 1 through pipe 2 will flow downwardly through pipe 14 to the space 12 within casing 4 which surrounds the electrode 5. The electrical circuit being completed through the water in space 12 the heat of the electrode will heat the water in said space. This heated water rising to the top of the casing will flow outwardly through pipe 15 back to the tank 1. The heated water will rise in tank 1 as indicated by the arrows and may be withdrawn as needed through the discharge pipe 3 at the top of the tank.

Various changes may be made without departing from the spirit of the invention as claimed.

What is claimed is:

1. A heater for fluids including a casing, an electrode in said casing, connections to said casing for fluid circulation upwardly through the same, a tank means for withdrawing fluid from the top of said casing into said tank, and an auxiliary discharge means at the top of said casing for directly withdrawing the heated fluid.

2. A heater for fluids including a tank, a fluid supply to said tank, a casing, an electrode in said casing, coöperating fluid conduits from said tank to said casing, from said casing to said tank, and from said tank.

3. A heater for fluids including a tank, a fluid supply to said tank, a casing, an electrode in said casing, a fluid discharge conduit from said tank to said casing, a fluid discharge conduit from said casing to said tank, a second fluid discharge from said tank, and auxiliary means for withdrawing fluid from said casing.

4. A heater for fluids including a tank, a fluid supply to the bottom of said tank, a casing, an electrode in said casing, and circulating means including a coöperating fluid supply from the bottom of said tank to the bottom of said casing, a fluid supply from the top of said casing to said tank, and a conduit for withdrawing fluid from the top of said tank.

In testimony whereof I have signed my name to this specification.

ARTHUR MAX WERNER.